US012034199B1

(12) United States Patent
Tang et al.

(10) Patent No.: US 12,034,199 B1
(45) Date of Patent: Jul. 9, 2024

(54) POLARIZATION TRACKER AND USE THEREOF

(71) Applicant: China Starwin Science & Technology Co., Ltd, Chengdu (CN)

(72) Inventors: Haijun Tang, Chengdu (CN); Nianbo Li, Chengdu (CN); Haizhong Li, Chengdu (CN); Kesong Wu, Chengdu (CN); Lianhui Peng, Chengdu (CN); Songlin Li, Chengdu (CN); Chengyue Jiang, Chengdu (CN)

(73) Assignee: CHINA STARWIN SCIENCE & TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 18/220,838

(22) Filed: Jul. 12, 2023

(30) Foreign Application Priority Data

Apr. 20, 2023 (CN) ........................ 202310427241.3

(51) Int. Cl.
*H01P 5/18* (2006.01)
*H01P 1/02* (2006.01)
*H01P 1/18* (2006.01)

(52) U.S. Cl.
CPC ................ *H01P 5/18* (2013.01); *H01P 1/022* (2013.01); *H01P 1/182* (2013.01)

(58) Field of Classification Search
CPC ............. H01P 5/18; H01P 1/022; H01P 1/182
USPC ........................................ 333/24.1, 109, 248
See application file for complete search history.

(56) References Cited

U.S. PATENT DOCUMENTS 5,068,668 A * 11/1991 Tsuda .................. H01Q 21/245 333/28 R

FOREIGN PATENT DOCUMENTS

CN 105098360 A 11/2015
CN 106450759 A 2/2017

* cited by examiner

*Primary Examiner* — Rakesh B Patel
*Assistant Examiner* — Jorge L Salazar, Jr.
(74) *Attorney, Agent, or Firm* — Bayramoglu Law Offices LLC

(57) ABSTRACT

A polarization tracker and use thereof are provided. The polarization tracker includes a waveguide housing, and a signal input end, a first directional coupler connected to the signal input end, a first reflective phase shifter and a second reflective phase shifter that are coupled to the first directional coupler, a second directional coupler, and a signal output end connected to the second directional coupler disposed in the waveguide housing.

11 Claims, 8 Drawing Sheets

POLARIZATION TRACKER AND USE THEREOF

CROSS REFERENCE TO THE RELATED APPLICATIONS

This application is based upon and claims priority to Chinese Patent Application No. 202310427241.3, filed on Apr. 20, 2023, the entire contents of which are incorporated herein by reference.

TECHNICAL FIELD

The present disclosure belongs to the field of communication technologies and relates to a polarization tracker for communication and use thereof.

BACKGROUND

A polarization tracker is a common component in mobile communication. Currently, there are two implementations of the polarization tracker: active and passive. An active polarization tracker has a simple principle, a short tracing time, and a low power capacity, and is generally only used at a receiving terminal of an antenna. Besides, key indexes such as a system standing wave and isolation cannot be directly tested by an instrument. A passive polarization tracker, especially a waveguide polarization tracker, can be used both at the receiving terminal and at a transmitting terminal, has advantages such as a low loss, a high-power capacity, testability, and has gradually replaced the active polarization tracker.

The passive polarization tracker usually requires its return loss and port isolation to be less than 1.2 (that is, −20 dB), and phases of two output ends are the same. Although the existing passive polarization tracker can meet use requirements of most of satellite communications on-the-move antennas, it still has disadvantages such as a complex structure, high processing accuracy of some key parts, inconvenient installation, and a low port standing wave and phase balance.

Chinese Patent CN105098360A discloses a new polarization tracker, which mainly includes a quadrature coupler, a signal output or output main port, a rotary rotor, and a motor, and mainly resolves a problem that two output arms of the current polarization tracker are not output in parallel. However, the polarization tracker still has several problems as follows: (1) An operation bandwidth is relatively narrow and phase consistency of the output port is low because of a key technology of the polarization tracker, which implements linear polarization tracking by rotating a U-shaped "rotary rotor" built in a form of a coaxial axis in a waveguide system, but a transition matching bandwidth from the coaxial axis to the waveguide system is relatively narrow. (2) A connection between upper and lower straight-arm waveguides of a quadrature mode coupler needs to be performed by using a combination of a plurality of waveguide matching blocks and coupling needles that penetrate two side walls of a waveguide cavity, a structure is complex, and processing and installation are difficult. (3) A U-shaped "rotary rotor" probe in a form of a coaxial axis in the waveguide system needs to be formed after three times of bending, and a bent probe needs to meet high processing accuracy.

Chinese Patent CN106450759A discloses a compact linear polarization tracker. The polarization tracker mainly includes an equal-phase quadrature mode coupler, a rotary quadrature mode coupler, an L-shaped waveguide rotary joint, and a stepper motor drive assembly. An anti-polarization signal is mainly coupled by using a coaxial probe and absorbed by using a coaxial load, which avoids impact on communication caused by a phase consistency problem of a flat panel array antenna system. However, the following disadvantages still exist. (1) The polarization tracker has a plurality of gears and bearings inside, has many parts and a complex structure. An assembly process is cumbersome and processing and assembly costs are high. (2) Output arms of the polarization tracker are in different directions.

In view of the foregoing analysis, it is necessary to design a new polarization tracker that is applied to a satellite communications on-the-move system ("an on-the-move system for satellite earth station communications" for short) to resolve the foregoing problem.

SUMMARY

For the foregoing deficiencies in the conventional technology, the present disclosure provides a polarization tracker which has a simple structure, is easy to process, and implements any polarization angle adjustment based on a polarization synthesis principle.

Another objective of the present disclosure is to provide application of the foregoing polarization tracker in signal polarization tracking.

To achieve the foregoing objective, the present disclosure adopts the following technical solution.

A polarization tracker provided in the present disclosure includes a waveguide housing, and a signal input end, a first directional coupler connected to the signal input end, a first reflective phase shifter and a second reflective phase shifter that are coupled to the first directional coupler, a second directional coupler, and a signal output end connected to the second directional coupler disposed in the waveguide housing.

The first directional coupler divides an input signal received at the signal input end into two output signals.

The first reflective phase shifter and the second reflective phase shifter respectively regulate and control the two output signals of the first directional coupler to obtain two phase shift signals; and a structure of the first reflective phase shifter is the same as a structure of the second reflective phase shifter, the first reflective phase shifter includes a first short-circuit stub, a third directional coupler, and a first metal piston that surrounds at least a part of the first short-circuit stub, and the second reflective phase shifter includes a second short-circuit stub, a fourth directional coupler, and a second metal piston that surrounds at least a part of the second short-circuit stub.

The second directional coupler is configured to perform a superposition output on the two phase shift signals to obtain two superposed output signals.

The signal output end is configured to separately convert the two superposed output signals into two final output signals.

An advantage of the present disclosure is as follows: With a directional coupler as a core, cooperated with a reflective phase shifter, and using a polarization synthesis principle as a basis, the present disclosure can achieve a continuous and linear adjustment of any polarization angle by regulating and controlling a position of a metal piston, and accurately adjust an output of a polarization angle by means of calculation.

Further, the signal input end includes a first signal input port, a first signal output port, and a first channel coupled to the first signal input port and the first signal output port. The first channel may be a straight-through channel, may be an L-shaped channel, or may be another abnormal channel, such as a Z-shaped channel. When the straight-through channel is used, an axis of the first channel is a straight line. When the L-shaped channel is used, the axis of the first channel is L-shaped.

Further, the first directional coupler, the second directional coupler, the third directional coupler, and the fourth directional coupler are all 3 dB couplers. Certainly, a directional coupler with another power split ratio may alternatively be selected.

Further, the first directional coupler, the second directional coupler, the third directional coupler, and the fourth directional coupler are all four-port components; a first port and a second port of the first directional coupler are respectively connected to a signal input end and a load end, and a third port and a fourth port of the first directional coupler are respectively connected to a first port of the third directional coupler and a third port of the fourth directional coupler by using a channel, such that the first directional coupler is coupled to the first reflective phase shifter and the second reflective phase shifter; a second port of the third directional coupler is connected to a first port of the second directional coupler by using a channel, and a fourth port of the fourth directional coupler is connected to a second port of the second directional coupler by using a channel, such that the first reflective phase shifter and the second reflective phase shifter are coupled to the second directional coupler; and a third port and a fourth port of the second directional coupler are connected to the signal output end.

Further, a wave absorbing material may be disposed in a cavity of the load end, so as to avoid that a signal transmitted by the first directional coupler to the load end is reflected to a fourth port.

Further, at least two separation blocks are disposed in cavities of the first directional coupler, the second directional coupler, the third directional coupler, and/or the fourth directional coupler. For example, the first directional coupler uses two separation blocks, that is, a first separation block and a second separation block. Along a signal transmission direction, a distance between the first separation block and the second separation block is greater than a distance between the first separation block and an inner wall of a cavity of the first directional coupler. In addition, the distance between the first separation block and the second separation block is greater than a distance between the second separation block and an inner wall of the cavity of the first directional coupler. The first directional coupler implements coupling of electromagnetic waves by using the distance between the first separation block and the second separation block, the distance between the first separation block and the inner wall of the cavity of the first directional coupler, the distance between the second separation block and the inner wall of the cavity of the first directional coupler, widths and lengths of the first separation block and the second separation block, and a width of the inner wall of the cavity of the first directional coupler. A transmission distance of an electromagnetic wave transmitted from an input port to an output port can be changed by changing the foregoing parameters, so as to change an amplitude and a phase of the output port. Performance of the first directional coupler is adjusted to the best by optimizing the foregoing parameters, such that an output amplitude in a relatively wide band is flat and a phase is stable.

Similarly, the second directional coupler, the third directional coupler, and the fourth directional coupler can be disposed in a same structure as the first directional coupler.

In addition, a quantity of separation blocks are not limited to two. Generally, a larger quantity of separation blocks, better directionality of a directional coupler, and an output power ratio of each port of the directional coupler correspondingly changes. A person skilled in the art may select a proper quantity of separation blocks according to an actual requirement, so as to obtain an expected power split ratio of each port and expected directionality.

Further, the polarization tracker further includes a coupling member that couples the first directional coupler, the second directional coupler, the third directional coupler, and the fourth directional coupler together; and the coupling member is in a shape of "I", and includes an upper connection part, a lower connection part, and a middle connection part between the upper connection part and the lower connection part.

Vertical end faces of corresponding directional couplers faced by two ends of the upper connection part and the lower connection part (that is, end faces of planes on which the two ends of the upper connection part and the lower connection part are perpendicular to the coupling member) are used as inner walls of cavities of the first directional coupler, the second directional coupler, the third directional coupler, and the fourth directional coupler. The middle connection part has curved or broken-line curved surfaces symmetrical about left and right sides, and may be configured to separately ensure that a signal from a fourth port of the first directional coupler to a third port of the fourth directional coupler and a signal from a second port of the third directional coupler to a first port of the second directional coupler have an extremely low transmission loss and good electrical performance by using two curved surfaces.

Further, the first metal piston of the first reflective phase shifter has a same center axis as the first short-circuit stub. When a position of the first metal piston is moved, a distance of the first short-circuit stub shielded by the first metal piston can be changed, such that a phase of a signal output by the first reflective phase shifter can be changed.

Further, the second metal piston of the second reflective phase shifter has a same center axis as the second short-circuit stub. When a position of the second metal piston is moved, a distance of the second short-circuit stub shielded by the second metal piston can be changed, such that a phase of a signal output by the second reflective phase shifter can be changed.

Further, a structure of the first metal piston is similar to a structure of the second metal piston, and an overall structure is U-shaped and is a mirror symmetrical structure. Both the first metal piston and the second metal piston include a first connecting member in a U-shaped structure, a second connecting member connected to two ends of an open end of the U-shaped structure of the first connecting member, and a third connecting member connected to the second connecting member by using a connection arm; and the third connecting member is of a U-shaped structure, an open end of the U-shaped structure faces the second connecting member, one end of the connection arm is connected to a middle of the second connecting member, and the other end of the connection arm extends into the third connecting member, and is connected to a middle position at a bottom of the U-shaped structure.

In addition, the first connecting member has a first width along a depth direction of a mounting groove on the housing, the second connecting member and the third connecting member have a second width along the depth direction of the mounting groove on the housing, and the second width is greater than the first width. The second connecting member and the third connecting member have a same width, such that contact between a metal piston and a metal wall of a mounting groove of the waveguide housing is ensured, and an energy leakage is reduced. The first width of the first connecting member is less than the second width of the second connecting member, and a size of a metal piston exposed outside the waveguide housing is reduced, thereby facilitating assembly with another apparatus. With this arrangement, a good choke effect can be ensured when a piston size is relatively short.

A thickness of each of two free arms of the U-shaped structure of the third connecting member is the same as a thickness of the connection arm, and is greater than a spacing between the U-shaped structure and the connection arm. Thicknesses and lengths of the two free arms and the connection arm affect the choke effect of the metal piston. A loss, stability, and the choke effect of the metal piston can be adjusted by optimizing the thicknesses and lengths of the three. In this way, a good choke effect can be ensured when a piston is relatively short. When stability is ensured, the loss is minimized to obtain an excellent standing wave ratio.

A screw hole is disposed in a middle position of the first connecting member, and is configured to connect to an external support rod.

Further, the signal output end includes a second signal input port, a third signal input port, a second signal output port, a third signal output port, a second channel coupled to the second signal input port and the second signal output port, and a third channel coupled to the third signal input port and the third signal output port. The second channel and the third channel have a same structure and are arranged symmetrically, and may be a straight-through channel, an L-shaped channel, or another abnormal channel, such as a Z-shaped channel. When the straight-through channel is used, an axis of the second channel or the third channel is a straight line. When the L-shaped channel is used, an axis of the second channel or the third channel is L-shaped. When the Z-shaped channel is used, an axis of the second channel or the third channel is Z-shaped.

Further, the signal input end, the first directional coupler, the second directional coupler, the first short-circuit stub of the first reflective phase shifter, the third directional coupler, the second short-circuit stub of the second reflective phase shifter, the fourth directional coupler, and the signal output end are integrally formed in the waveguide housing.

Advantages of the foregoing further solutions are as follows: A structure is simple, it is easy to process and assemble, and there are few parts. Processing can be implemented only cutting it in half by means of machining, and an accuracy requirement for machining is not high. Compared with a product in the conventional technology, use of a coaxial probe is reduced, thereby reducing processing difficulty and assembling difficulty.

The present disclosure further provides use of the polarization tracker in microwave or radio frequency communication. The polarization tracker is configured to perform signal polarization tracking. The first metal piston of the first reflective phase shifter and the second metal piston of the second reflective phase shifter are controlled to simultaneously move in a same direction with a same moving distances, such that a polarization angle of the polarization tracker varies linearly with the moving distance of the metal pistons. The polarization angle is 0° to 180°. A total output signal amplitude of the second signal output port is only related to −sin ($\Delta\Phi$), a total output signal amplitude of the third signal output port is only related to cos ($\Delta\Phi$), where $A\Phi=(\Phi(b2)-\Phi(d1))-(\Phi(a2)-\Phi(c1))$.

Figure 1:
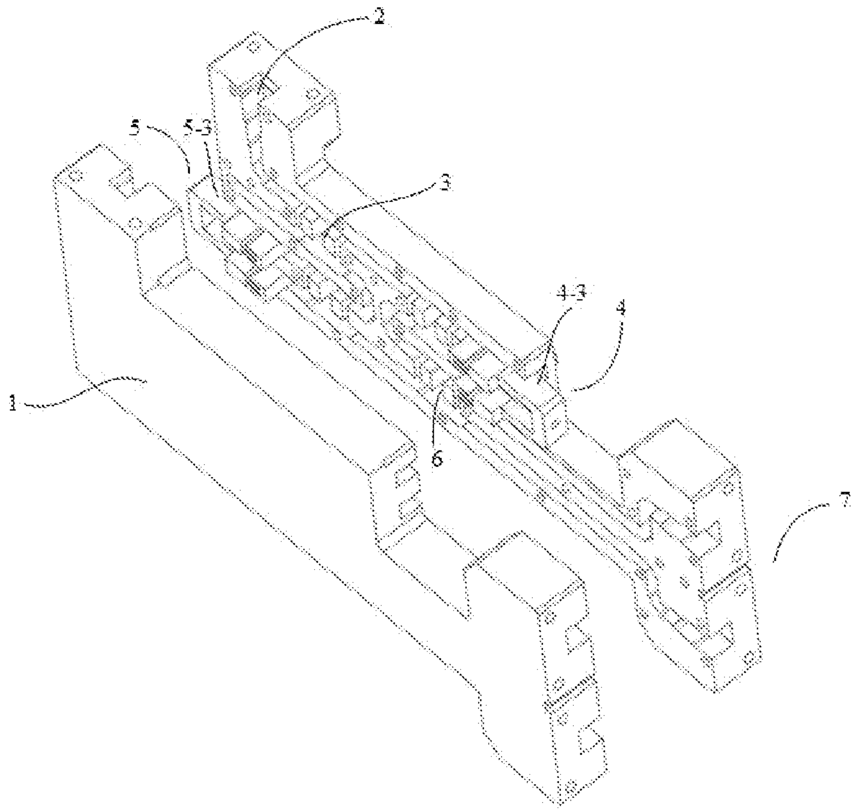
FIG. 1 is a schematic diagram of a structure of a polarization tracker.

Reference numerals: 1. waveguide housing; 2. signal input end; 2-1. first signal input port; 2-2. first signal output port; 2-3. first channel; 3. first directional coupler; 3-1. first separation block; 3-2. second separation block; 4. first reflective phase shifter; 4-1. first short-circuit stub; 4-2. third directional coupler; 4-3. first metal piston; 4-3-1. first connecting member; 4-3-2. second connecting member; 4-3-3. connection arm; 4-3-4. third connecting member; 4-3-4-1. free arm; 5. second reflective phase shifter; 5-1. second short-circuit stub; 5-2. fourth directional coupler; 5-3. second metal piston; 6. second directional coupler; 7. signal output end; 7-1. second signal input port; 7-2. third signal input port; 7-3. second signal output port; 7-4. third signal output port; 7-5. second channel; 7-6. third channel; 8. load end; 9. coupling member; 9-1. upper connection part; 9-2. lower connection part; 9-3. middle connection part.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Embodiment 1

Figure 2:
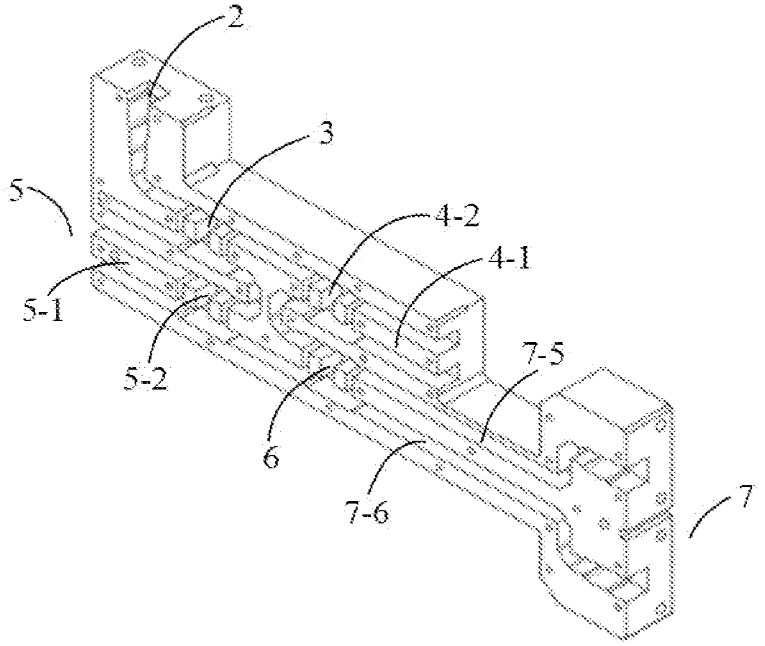
FIG. 2 is a schematic diagram of an inside of a waveguide housing of a polarization tracker.
Figure 3:
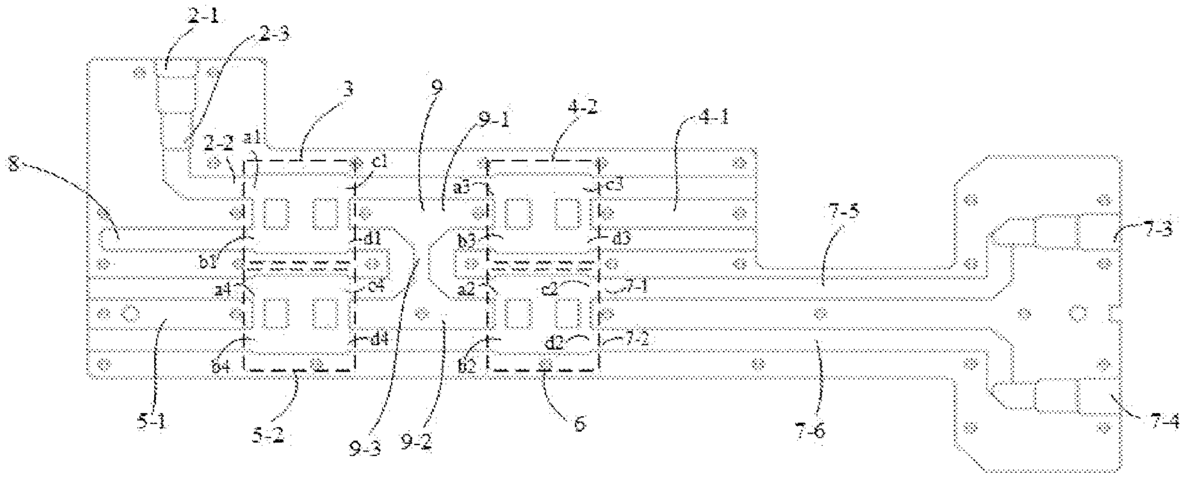
FIG. 3 is a schematic diagram of projection inside the waveguide housing of a polarization tracker in FIG. 2.

As shown in FIGS. 1-3, a polarization tracker provided in this embodiment includes waveguide housing 1, signal input end 2, first directional coupler 3, first reflective phase shifter 4, second reflective phase shifter 5, second directional coupler 6, and signal output end 7 that are disposed in the waveguide housing. The first directional coupler divides an input signal received at the signal input end into two output signals. The first reflective phase shifter and the second reflective phase shifter respectively regulate and control the two output signals of the first directional coupler to obtain two phase shift signals. The second directional coupler is configured to perform a superposition output on the two phase shift signals to obtain two superposed output signals. The signal output end is configured to separately convert the two superposed output signals into two final output signals.

As shown in FIGS. 1-3, the signal input end 2 includes first signal input port 2-1, first signal output port 2-2, and first channel 2-3 coupled to the first signal input port and the first signal output port. As an example, the first channel may be a straight-through channel, may be an L-shaped channel, or may be another abnormal channel, such as a Z-shaped channel. When the straight-through channel is used, an axis of the first channel is a straight line. When the L-shaped channel is used, an axis of the first channel is L-shaped. In this embodiment, the signal input end 2 has the L-shaped channel.

As shown in FIGS. 1-3, the signal output terminal 7 includes second signal input port 7-1, third signal input port 7-2, second signal output port 7-3, and third signal output port 7-4, and further includes second channel 7-5 coupled to the second signal input port 7-1 and the second signal output port 7-3, and third channel 7-6 coupled to the third signal input port 7-2 and the third signal output port 7-4. As an example, the second channel or the third channel may be a straight-through channel, may be an L-shaped channel, or may be another abnormal channel, such as a Z-shaped channel. When the straight-through channel is used, an axis of the second channel or the third channel is a straight line. When the L-shaped channel is used, an axis of the second channel or the third channel is L-shaped. When the Z-shaped channel is used, an axis of the second channel or the third channel is Z-shaped. In this embodiment, the second channel and the third channel are symmetrically arranged and have Z-shaped channels, parts corresponding to the second signal output port and the third signal output port have stepped structures, and a width of channels gradually increases, so as to match an electromagnetic field and a mode field located behind a polarization tracker.

As shown in FIG. 3, both the first directional coupler 3 and the second directional coupler 6 are 3 dB couplers. Certainly, a directional coupler with another power split ratio may alternatively be selected. Structures of the first directional coupler 3 and the second directional coupler 6 are the same, and are both four-port components. Four ports of the first directional coupler 3 are respectively first port a1, second port b1, third port c1, and fourth port d1. Four ports of the second directional coupler 6 are respectively first port a2, second port b2, third port c2, and fourth port d2. The first port a1 and the second port b1 of the first directional coupler are respectively connected to the first signal output port 2-2 of the signal input end and a load end 8. The third port c2 and the fourth port d2 of the second directional coupler are respectively connected to the second signal input port 7-1 and the third signal input port 7-2 of the signal output end.

As shown in FIGS. 1-2, a structure of the first reflective phase shifter 4 is the same as a structure of the second reflective phase shifter 5. The first reflective phase shifter 4 includes first short-circuit stub 4-1, third directional coupler 4-2, and first metal piston 4-3 that surrounds at least a part of the first short-circuit stub 4-1. The first metal piston 4-3 may alternatively surround an entire first short-circuit stub. The second reflective phase shifter 5 includes second short-circuit stub 5-1, fourth directional coupler 5-2, and second metal piston 5-3 that surrounds at least a part of the second short-circuit stub 5-1. The second metal piston 5-3 may alternatively surround an entire second short-circuit stub. The first metal piston 4-3 and the second metal piston 5-3 are separately mounted in mounting grooves disposed in a fluctuation housing, and the mounting grooves are separately connected to corresponding directional couplers.

The first metal piston 4-3 and the first short-circuit stub 4-1 have a same center axis. When a position of the first metal piston is moved, a distance of the first short-circuit stub shielded by the first metal piston can be changed, such that a phase of a signal output by the first reflective phase shifter can be changed.

Similarly, the second metal piston 5-3 has a same center axis as the second short-circuit stub 5-1. When a position of the second metal piston is moved, a distance of the second short-circuit stub shielded by the second metal piston can be changed, such that a phase of a signal output by the second reflective phase shifter can be changed.

The third directional coupler 4-2 and the fourth directional coupler 5-2 are both 3 dB couplers. Certainly, a directional coupler with another power split ratio may alternatively be selected. Structures of the third directional coupler 4-2 and the fourth directional coupler 5-2 and structures of the first directional coupler and the second directional coupler that are provided above are the same, and all are four-port couplers. Four ports of the third directional coupler 4-2 are respectively first port a3, second port b3, third port c3, and fourth port d3. Four ports of the fourth directional coupler 5-2 are respectively first port a4, second port b4, third port c4, and fourth port d4. The first port a3 and the second port b3 of the third directional coupler 4-2 are separately connected to the third port c1 of the first directional coupler and the first port a2 of the second directional coupler by using a channel. The third port c4 and the fourth port d4 of the fourth directional coupler are separately connected to the fourth port d1 of the first directional coupler and the second port b2 of the second directional coupler by using a channel.

The waveguide housing 1 includes two parts that are symmetrically distributed, and each part is provided with grooves that are configured to form the signal input end 2, the first directional coupler 3, the first reflective phase shifter 4, the second reflective phase shifter 5, the second directional coupler 6, and the signal output end 7. After the two parts are docked, the signal input end 2, the first directional coupler 3, the first reflective phase shifter 4, the second reflective phase shifter 5, the second directional coupler 6, and the signal output end 7 can be formed.

A ratio of an amplitude of the second signal input port 7-1 and an amplitude of the third signal input port 7-2 may be adjusted by using a metal piston of the first reflective phase shifter and/or the second reflective phase shifter. For example, a specific ratio of the second signal input port 7-1 and the third signal input port 7-2 is N, where N is related to a phase difference ΔΦ, and AΦ=(Φ(b2)−Φ(d1))−(Φ(a2)−Φ(c1)). Φ(a2) is a phase value at the first port a2 of the second directional coupler, and ((c1) is a phase value at the third port c1 of the first directional coupler, ((b2) is a phase value at the second port b2 of the second directional coupler, and ((d1) is a phase value at the fourth port d1 of the first directional coupler. The third port c1 of the first directional coupler, the first port a3 of the third directional coupler, the second port b3 of the third directional coupler, and the first port a2 of the second directional coupler are successively connected, and the fourth port d1 of the first directional coupler, the third port c4 of the fourth directional coupler, the fourth port d4 of the fourth directional coupler, and the second port b2 of the second directional coupler are successively connected, such that the first directional coupler, the second directional coupler, the first reflective phase shifter, and the second reflective phase shifter are connected as a whole, to constitute a polarization tracker.

An operating principle of the polarization tracker provided in this embodiment is as follows:

An electromagnetic wave signal A sin (wt+Φ1) whose amplitude is A, frequency is w, and initial phase is Φ1 enters from the signal input end 2, passes through the first directional coupler 3 used for inputting a signal, a signal output from the third port c1 of the first directional coupler 3 is $\sqrt{2}/2$A sin (wt+Φ1), and a signal output from the fourth port d1 is $\sqrt{2}/2$A cos (wt+Φ1). The signal output from the third port c1 of the first directional coupler enters the first reflective phase shifter from the first port a3 of the third directional coupler, and when the signal is output from the second port b3 and reaches the first port a2 of the second directional coupler 2, the signal is $\sqrt{2}/2$A sin (wt+Φ1+Φ(a2)−Φ(c1)). The signal output from the fourth port d1 of the first directional coupler enters the second reflective phase shifter from the third port c4 of the fourth directional coupler 5-2, and when the signal is output from the fourth port d4 and reaches the second port b2 of the second directional coupler, the signal is $\sqrt{2}/2$A cos (wt+Φ1+Φ(b2)−Φ(d1)). A signal input at the first port a2 of the second directional coupler passes through the second directional coupler used for outputting a signal, a signal output at the third port c2 is ½A sin (wt+Φ1+Φ(a2)−Φ(c1)), and a signal output at the fourth port d2 is ½A cos (wt+Φ1+Φ(a2)−Φ(c1)). A signal input at the second port b2 of the second directional coupler passes through the second directional coupler used for outputting a signal, a signal output at the third port c2 is −½A sin (wt+Φ1+Φ(b2)−Φ(d1)), and a signal output at the fourth port d2 is ½A cos (wt+Φ1+Φ(b2)−Φ(d1)). In conclusion, a total output signal of the third port c2 is ½A sin (wt+Φ1+Φ(a2)−Φ(c1))−½A sin (wt+Φ1+β(b2)−Φ(d1)), and a total output signal of the fourth port d2 is ½A cos (wt+Φ1+Φ(a2)−Φ(c1))+½A cos (wt+Φ1+Φ(b2)−Φ(d1)). By means of simplification through a trigonometric function and a difference-to-product formula, it is obtained that an amplitude of the total output signal of the third port c2 is only related to −sin (ΔΦ), and an amplitude of the total output signal of the fourth port d2 is only related to cos (ΔΦ), where a phase difference ΔΦ=(Φ(b2)−Φ(d1))−(Φ(a2)−<(c1)).

Figure 4:
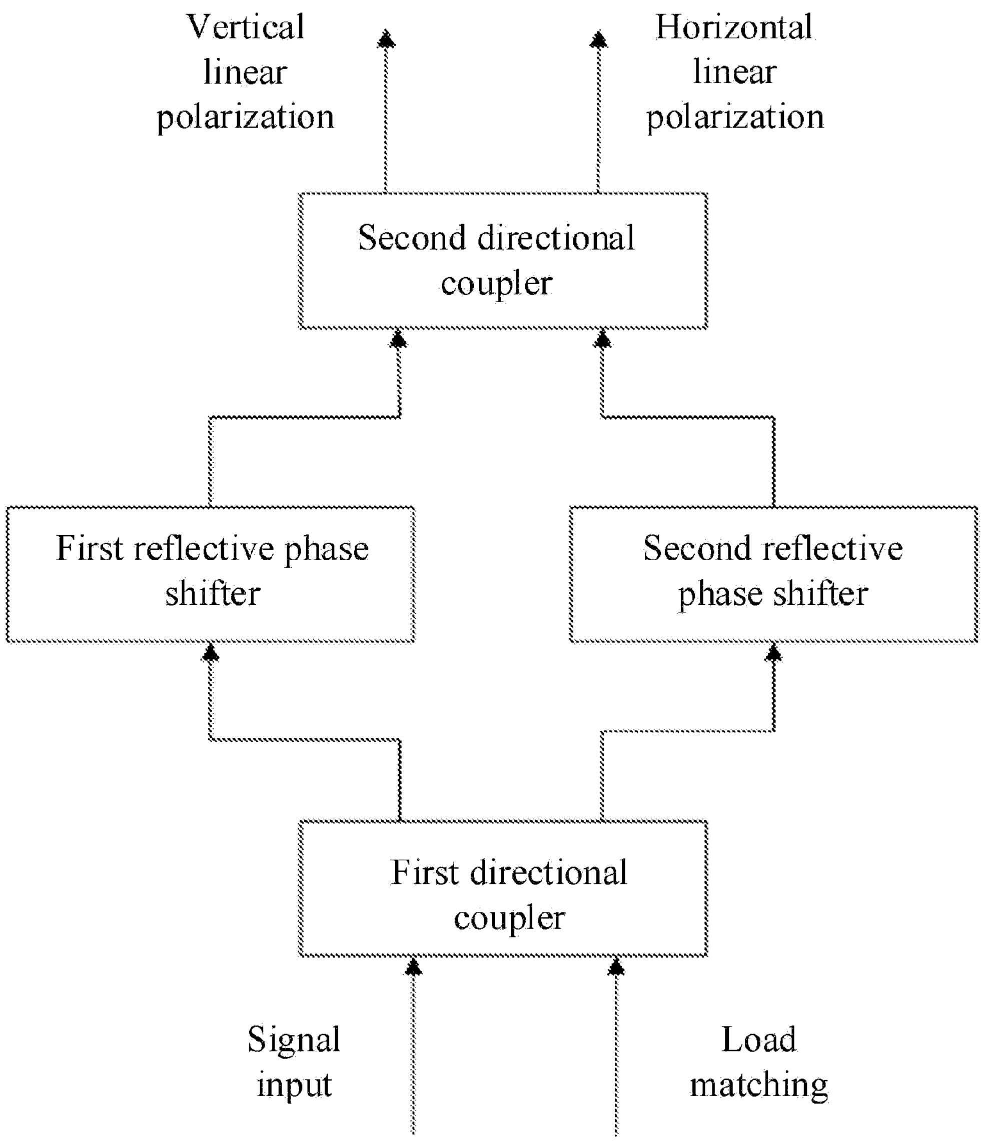
FIG. 4 is a schematic diagram of polarization angle rotation of a polarization tracker.

A principle for adjusting a polarization angle is as follows:

A theoretical basis of polarization synthesis is that any polarized electromagnetic wave in space can be synthesized by using a pair of quadrature linear polarization waves with different amplitude ratios and phase differences. Linear polarization at any angle in space can be decomposed into a horizontal polarization component and a vertical polarization component. On the contrary, the horizontal polarization component and the vertical polarization component may also be synthesized into linear polarization at any angle, and only amplitudes and phases of the horizontal polarization component and the vertical polarization component need to be changed. A dual-linear polarization antenna is used to synthesize any linear polarization, which can be implement by controlling phase differences of two quadrature linear polarization channels. For a specific schematic diagram, refer to FIG. 4. The polarization tracker in the present disclosure changes a phase output by a reflective phase shifter by changing a position of a metal piston, so as to affect a ratio of a total output signal amplitude of the second signal input port 7-1 to a total output signal amplitude of the third signal input port 7-2, and further adjusts a polarization angle rotation according to a polarization synthesis principle, so as to implement a polarization tracking function.

Embodiment 2

This embodiment makes further improvement based on Embodiment 1.

At least two separation blocks are disposed in cavities of the first directional coupler, the second directional coupler, the third directional coupler, and/or the fourth directional coupler.

In this embodiment, the first directional coupler is used as an example to explain a function of a separation block. The first directional coupler 3 has two separation blocks, that is, first separation block 3-1 and second separation block 3-2. Along a signal transmission direction, a distance between the first separation block and the second separation block is greater than distances between each of the first separation block 3-1 and the second separation block 3-2 and adjacent inner walls in a cavity of the first directional coupler. The first separation block 3-1 and the second separation block 3-2 have a same size, and a width of the first separation block 3-1 and the second separation block 3-2 is less than a width of adjacent inner walls in the cavity of the first directional coupler.

Figure 5:
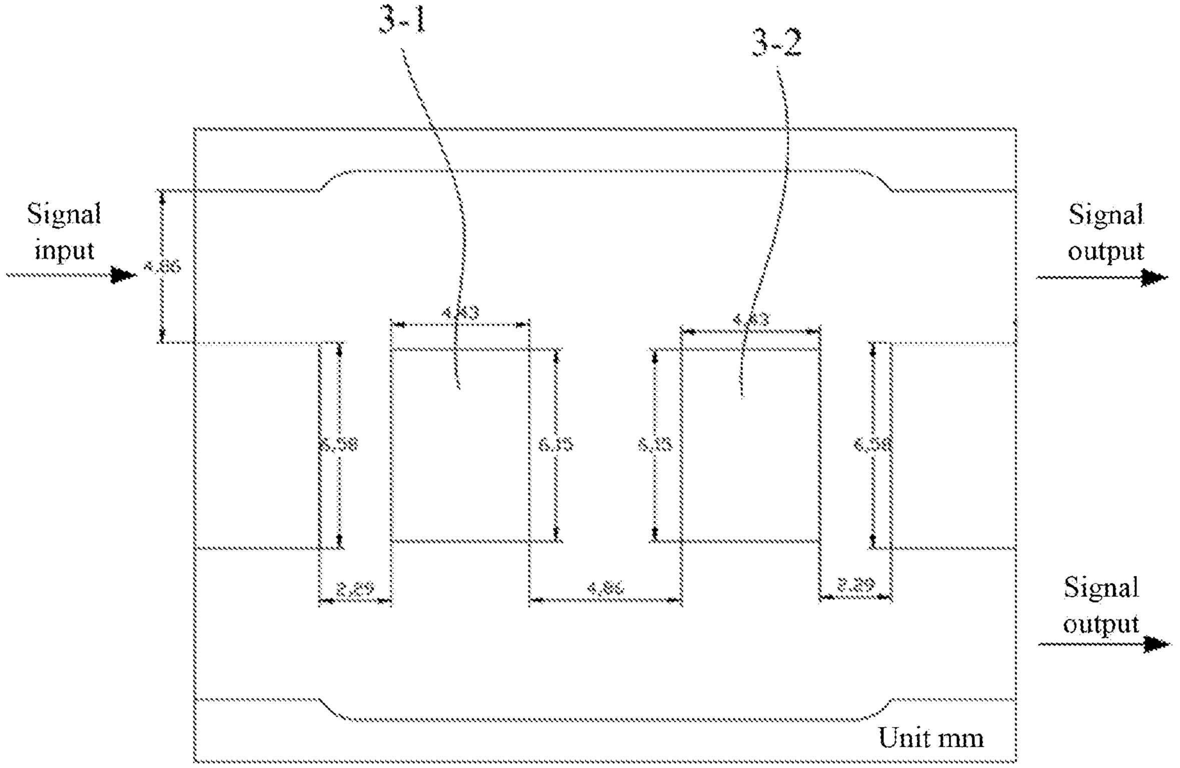
FIG. 5 is a partially enlarged schematic diagram of a first directional coupler.

Herein, as shown in FIG. 5, the distance between the first separation block 3-1 and the second separation block 3-2 is 4.86 mm. Along a signal transmission direction, distances between each of the first separation block 3-1 and the second separation block 3-2 and adjacent inner walls in the cavity of the first directional coupler are 2.29 mm. In addition, lengths and widths of both the first separation block and the second separation block are 4.43 mm and 6.15 mm, and widths of adjacent inner walls in the cavity of the first directional coupler are 6.58 mm. In addition, widths of the first port a1, the second port b1, the third port c1, the fourth port d1 of the first directional coupler are 4.86 mm. In addition, connections at which inner walls of an upper channel and inner walls of a lower channel in the cavity of the first directional coupler are connected to the first port a1, the second port b1, the third port c1, and the fourth port d1 are disposed with arc-shaped chamfers, to meet a processing requirement.

The first directional coupler implements electromagnetic wave coupling by using the distance between the first separation block and the second separation block along a signal transmission direction, a distance between the first separation block and an inner wall in the cavity of the first directional coupler, a distance between the second separation block and an inner wall in the cavity of the first directional coupler, widths and lengths of the first separation block and the second separation block, and a width of the inner wall in the cavity of the first directional coupler. A transmission distance of an electromagnetic wave transmitted from an input port to an output port can be changed by changing the foregoing parameters, so as to change an amplitude and a phase of the output port. Performance of the first directional coupler is adjusted to the best by optimizing the foregoing parameters, such that an output amplitude in a relatively wide band is flat and a phase is stable.

Similarly, the second directional coupler, the third directional coupler, and the fourth directional coupler can be disposed in a same structure as the first directional coupler.

In addition, a quantity of separation blocks are not limited to two. Generally, a larger quantity of separation blocks, better directionality of a directional coupler, and an output power ratio of each port of the directional coupler correspondingly changes. A person skilled in the art may select a proper quantity of separation blocks according to an actual requirement, so as to obtain an expected power split ratio of each port and expected directionality.

Embodiment 3

This embodiment makes further improvement based on Embodiment 1 and/or Embodiment 2, and mainly improves a structure of a first metal piston and a structure of a second metal piston.

Figure 6:
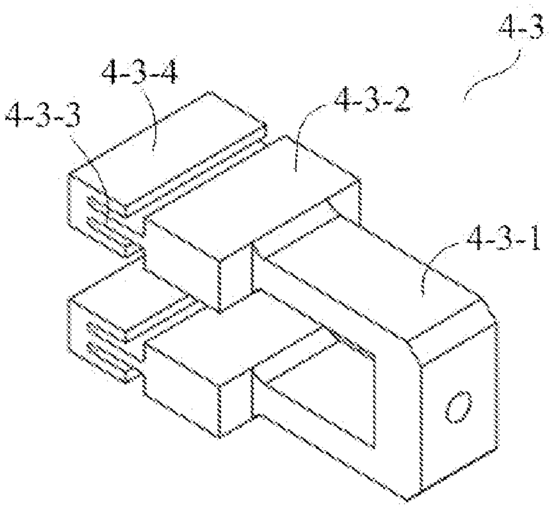
FIG. 6 is a schematic diagram of a structure of a first metal piston.
Figure 7:
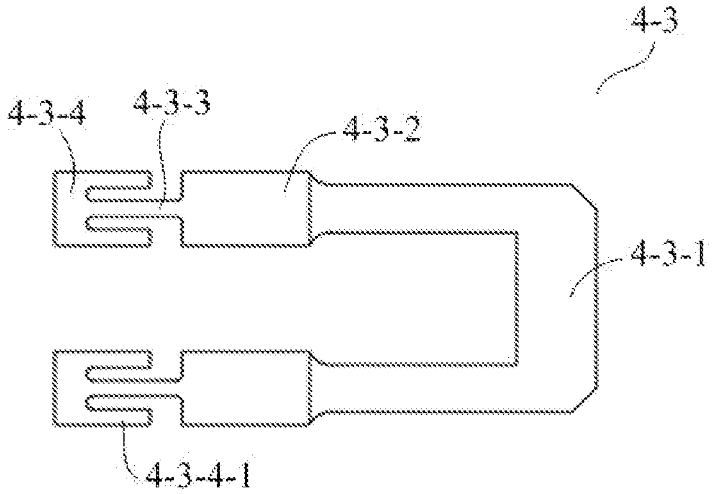
FIG. 7 is a front view of the first metal piston in FIG. 6.

As shown in FIG. 1, FIG. 6, and FIG. 7, a structure of the first metal piston 4-3 is the same as a structure of the second metal piston 5-3, and an overall structure is U-shaped and is a mirror symmetrical structure. The following uses the first metal piston 4-3 as an example to describe a structure of the first metal piston 4-3 in detail.

The first metal piston 4-3 includes first connecting member 4-3-1 in a U-shaped structure, second connecting member 4-3-2 connected to two ends of an open end of the U-shaped structure of the first connecting member, and third connecting member 4-3-4 connected to the second connecting member 4-3-2 by using connection arm 4-3-3. The third connecting member 4-3-4 is of a U-shaped structure, and an open end of the U-shaped structure faces the second connecting member. One end of the connection arm 4-3-3 is connected to a middle of the second connecting member, and the other end of the connection arm extends into the third connecting member 4-3-4, and is connected to a middle position at a bottom of the U-shaped structure.

In addition, the first connecting member has a first width along a depth direction of a mounting groove on the waveguide housing, the second connecting member and the third connecting member have a second width along the depth direction of the mounting groove on the housing, and the second width is greater than the first width. The second connecting member and the third connecting member have a same width, such that contact between the metal piston and a metal wall of the mounting groove of the waveguide housing is well ensured, and an energy leakage is reduced. The first width of the first connecting member is less than the second width of the second connecting member, and a size of a metal piston exposed outside the waveguide housing is reduced, thereby facilitating assembly with another apparatus. With this arrangement, a good choke effect can be ensured when a piston size is relatively short.

A thickness of each of two free arms of the U-shaped structure of the third connecting member is the same as a thickness of the connection arm, and is greater than a spacing between the U-shaped structure and the connection arm. Thicknesses and lengths of the two free arms and the connection arm affect the choke effect of the metal piston. A loss, stability, and the choke effect of the metal piston can be adjusted by optimizing the thicknesses and lengths of the three. In this way, a good choke effect can be ensured when a piston is relatively short. When stability is ensured, the loss is minimized to obtain an excellent standing wave ratio.

A screw hole is disposed in a middle position of the first connecting member, and is configured to connect to an external support rod. The support rod can be further connected to a motor drive mechanism, and the motor drives the first metal piston to move in a straight line along the mounting groove on the housing, so as to change a position of the first metal piston.

Embodiment 4

This embodiment makes further improvement based on Embodiment 1, Embodiment 2, and/or Embodiment 3.

In this embodiment, as shown in FIG. 3, the polarization tracker further includes coupling member 9 that couples the first directional coupler 3, the second directional coupler 6, the third directional coupler 4-2, and the fourth directional coupler 5-2 together. The coupling member 9 is in a shape of “I”, and includes upper connection part 9-1, lower connection part 9-2, and middle connection part 9-3 between the upper connection part and the lower connection part.

Vertical end faces of corresponding directional couplers faced by two ends of the upper connection part and the lower connection part (that is, end faces of planes on which the two ends of the upper connection part and the lower connection part are perpendicular to the coupling member) are used as inner walls of cavities of the first directional coupler, the second directional coupler, the third directional coupler, and the fourth directional coupler.

The middle connection part 9-3 has curved or broken-line curved surfaces symmetrical about left and right sides, and may be configured to separately ensure that a signal from a fourth port d1 of the first directional coupler 3 to the third port c4 of the fourth directional coupler 5-2 and a signal from the second port b3 of the third directional coupler 4-2 to the first port a2 of the second directional coupler have an extremely low transmission loss and good electrical performance by using two curved surfaces.

Embodiment 5

To indicate performance of the polarization tracker provided in the present disclosure, a series of simulations are performed based on Embodiment 4.

In this embodiment, the first metal piston 4-3 of the first reflective phase shifter 4 and the second metal piston 5-3 of the second reflective phase shifter 5 are controlled to move in a same direction simultaneously, and moving distances are the same, and are set as P1. It is also set that when a value of P1 (for example, a range from 0 mm to 10 mm) gradually increases, the first metal piston 4-3 in the first reflective phase shifter 4 gradually moves outward (that is, a direction away from the third directional coupler), and the second metal piston 5-3 in the second reflective phase shifter 5 gradually moves inward (that is, a direction close to the fourth directional coupler). In addition, when P1=0, a distance between a third connecting member end of the first metal piston 4-3 and the third directional coupler is a threshold lower limit of a set distance; and a distance between a third connecting member end of the second metal piston 5-3 and the fourth directional coupler is a threshold upper limit of the set distance. A distance threshold provided in this embodiment is [2.86 mm, 12.86 mm].

Figure 8:
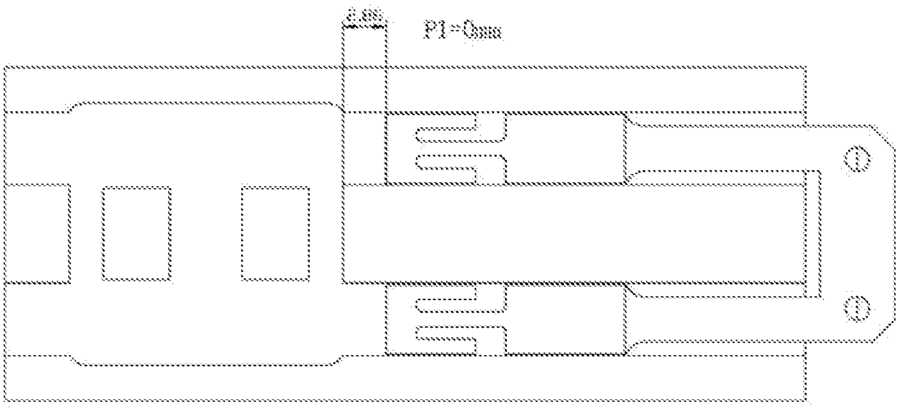
FIG. 8 is a position of a first metal piston when a moving distance of the first metal piston in a first reflective phase shifter is P1=0 mm.
Figure 9:
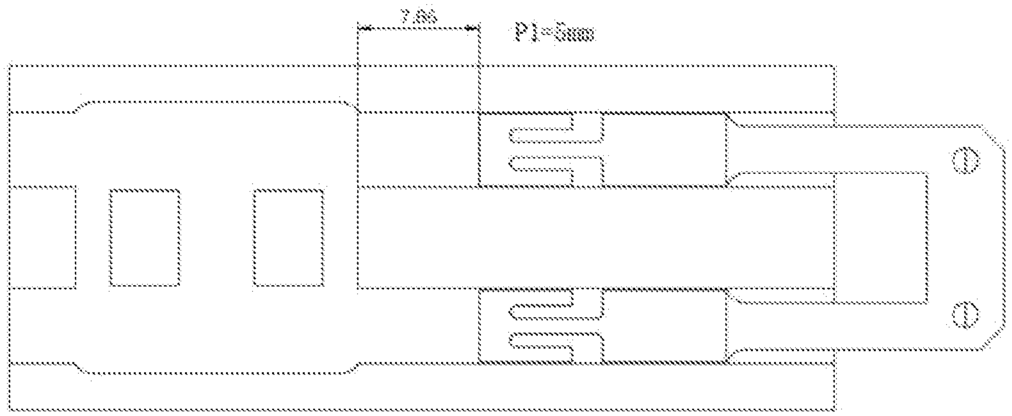
FIG. 9 is a position of a first metal piston when a moving distance of the first metal piston in a first reflective phase shifter is P1=5 mm.
Figure 10:
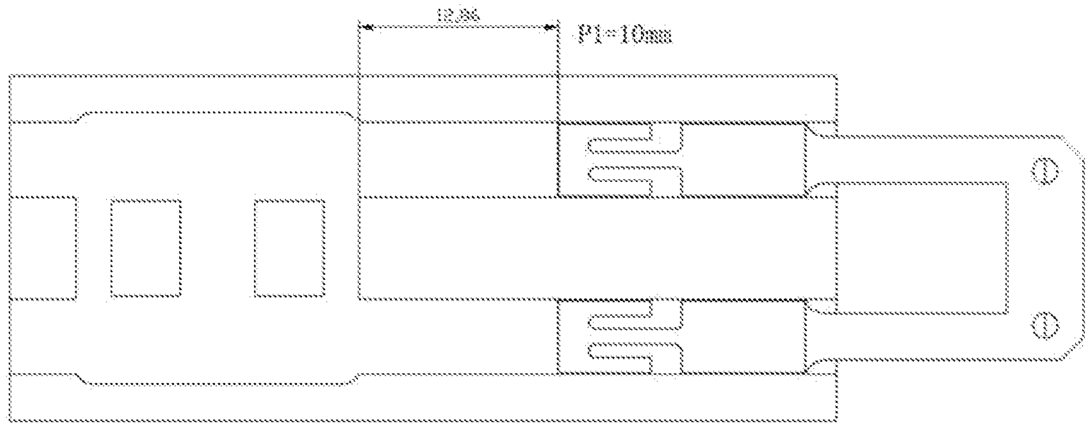
FIG. 10 is a position of a first metal piston when a moving distance of the first metal piston in a first reflective phase shifter is P1=10 mm.

As shown in FIG. 8 to FIG. 10, for the first reflective phase shifter 4, when the first metal piston 4-3 does not move (that is, P1=0 mm), a distance (that is, a distance between the third connecting member end of the first metal piston 4-3 and an end of the first short-circuit stub 4-1 away from the bottom of the first connecting member 4-3-1) between the third connecting member end of the first metal piston 4-3 and the third directional coupler is 2.86 mm; when a moving distance of the first metal piston 4-3 is P1=5 mm, a distance between the third connecting member end of the first metal piston 4-3 and the third directional coupler is 7.86 mm; or when a moving distance of the first metal piston 4-3 is P1=10 mm, a distance between the third connecting member end of the first metal piston 4-3 and the third directional coupler is 12.86 mm.

Figure 11:
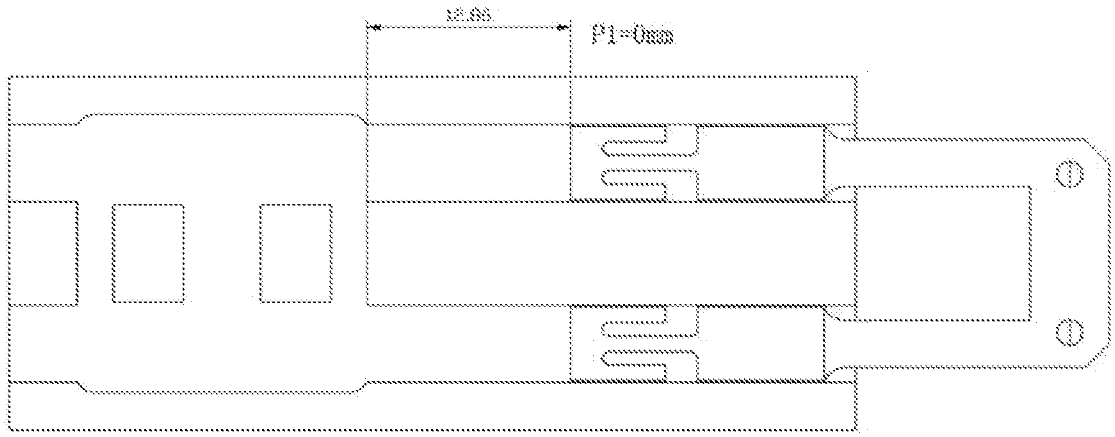
FIG. 11 is a position of a second metal piston when a moving distance of the second metal piston in a second reflective phase shifter is P1=0 mm.
Figure 12:
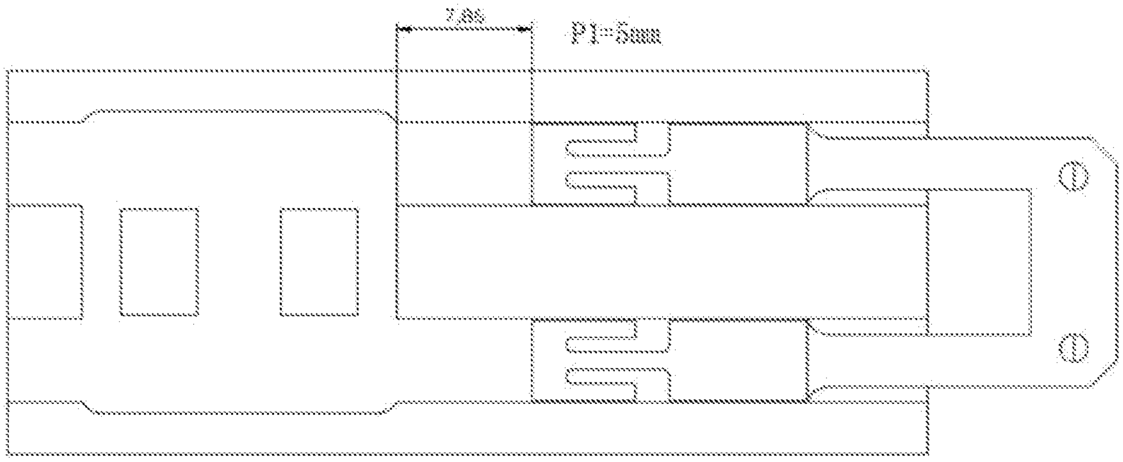
FIG. 12 is a position of a second metal piston when a moving distance of the second metal piston in a second reflective phase shifter is P1=5 mm.
Figure 13:
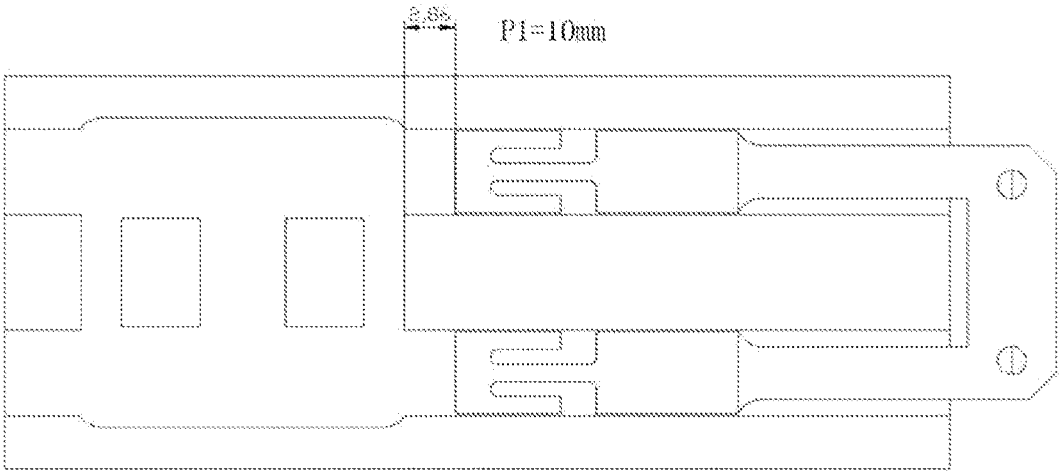
FIG. 13 is a position of a second metal piston when a moving distance of the second metal piston in a second reflective phase shifter is P1=10 mm.

As shown in FIG. 11 to FIG. 13, for the second reflective phase shifter 5, when the second metal piston 5-3 does not move (that is, P1=0 mm), a distance (that is, a distance between the third connecting member end of the second metal piston 5-3 and an end of the second short-circuit stub 5-1 away from a bottom of the first connecting member) between the third connecting member end of the second metal piston 5-3 and the fourth directional coupler is 12.86 mm; when a moving distance of the second metal piston 5-3 is P1=5 mm, a distance between the third connecting member end of the second metal piston 5-3 and the fourth directional coupler is 7.86 mm; or when a moving distance of the second metal piston 5-3 is P1=10 mm, a distance between the third connecting member end of the second metal piston 5-3 and the fourth directional coupler is 2.86 mm.

Figure 14:
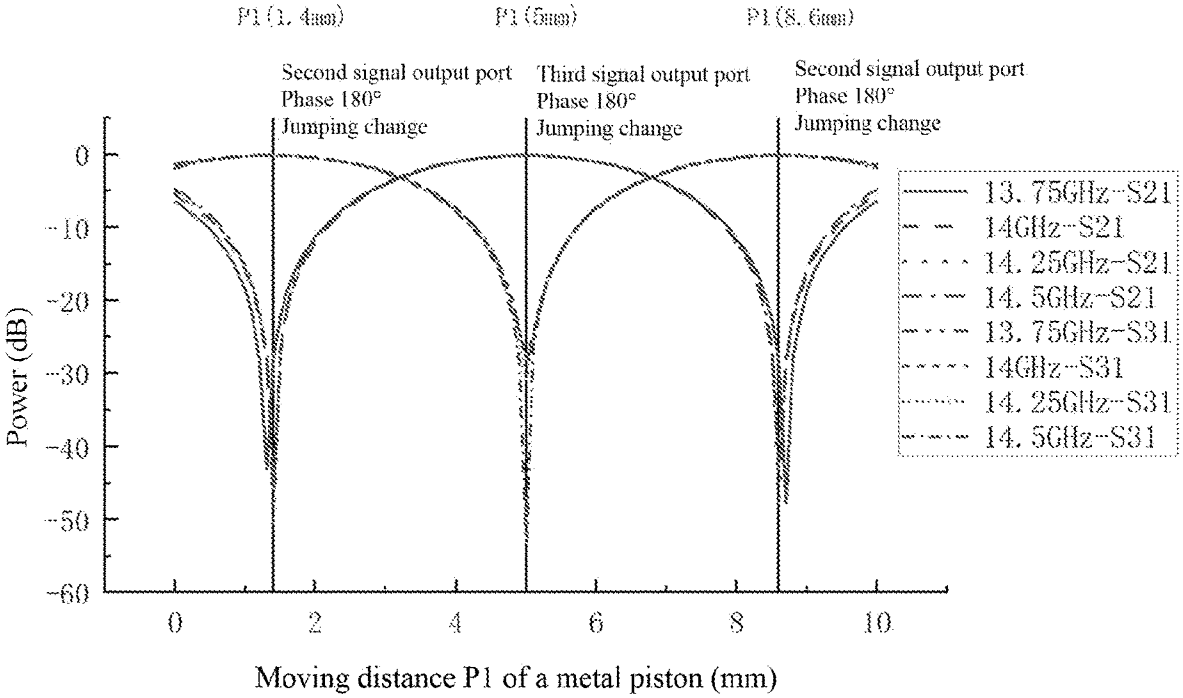
FIG. 14 is a relationship among transmission coefficient S21 and S31 of a polarization tracker, and a phase changing with a moving distance of a metal piston; where the transmission coefficient S21 represents a transmission coefficient from a signal input end to a second signal output port, and the transmission coefficient S31 represents a transmission coefficient from a signal input end to a third signal output port.

FIG. 14 shows that at different frequencies, a relationship among transmission coefficient S21 from the signal input end 2 to the second signal output port 7-3, transmission coefficient S31 from the signal input end 2 to the third signal output port 7-4, and phases of two signal output ports changing with a moving distance P1 of a metal piston.

(1) A relationship of the transmission coefficient S21 from the signal input end 2 to the second signal output port 7-3 changing with the moving distance P1 of the metal piston As a value of P1 gradually increases from 0 mm to 10 mm, S21 in a 13.75 GHz to 14.5 GHz frequency range presents the following trend:

a) When P1=0 mm to P1=1.4 mm, S21 gradually decreases;
b) When P1=1.4 mm to P1=5 mm, S21 gradually increases;
c) When P1=5 mm to P1=8.6 mm, S21 gradually decreases;
d) When P1=8.6 mm to P1=10 mm, S21 gradually increases.

(2) A relationship of the transmission coefficient S31 from the signal input end 2 to the third signal output port 7-4 changing with the moving distance P1 of the metal piston As a value of P1 gradually increases from 0 mm to 10 mm, S31 in a 13.75 GHz to 14.5 GHz frequency range presents the following trend:

a) When P1=0 mm to P1=1.4 mm, S31 gradually increases;
b) When P1=1.4 mm to P1=5 mm, S31 gradually decreases;
c) When P1=5 mm to P1=8.6 mm, S31 gradually increases;
d) When P1=8.6 mm to P1=10 mm, S31 gradually decreases.

(3) Phase changes of the second signal output port and the third signal output port present the following features:

When P1=1.4 mm, the phase of the third signal output port 7-4 remains unchanged, and the phase of the second signal output port 7-3 changes by 180°. When P=5 mm, the phase of the third signal output port 7-4 changes by 180°, and the phase of the second signal output port 7-3 remains unchanged. When P1=8.6 mm, the phase of the third signal output port 7-4 remains unchanged, and the phase of the second signal output port 7-3 changes by 180°.

According to a polarization synthesis principle, effects of amplitude and phase changing of both the second signal output port 7-3 and the third signal output port 7-4 on a polarization angle are analyzed, and the polarization angle is $$\alpha = \pm\arctan\left(\frac{V_{21}}{V_{31}}\right).$$

Figure 15:
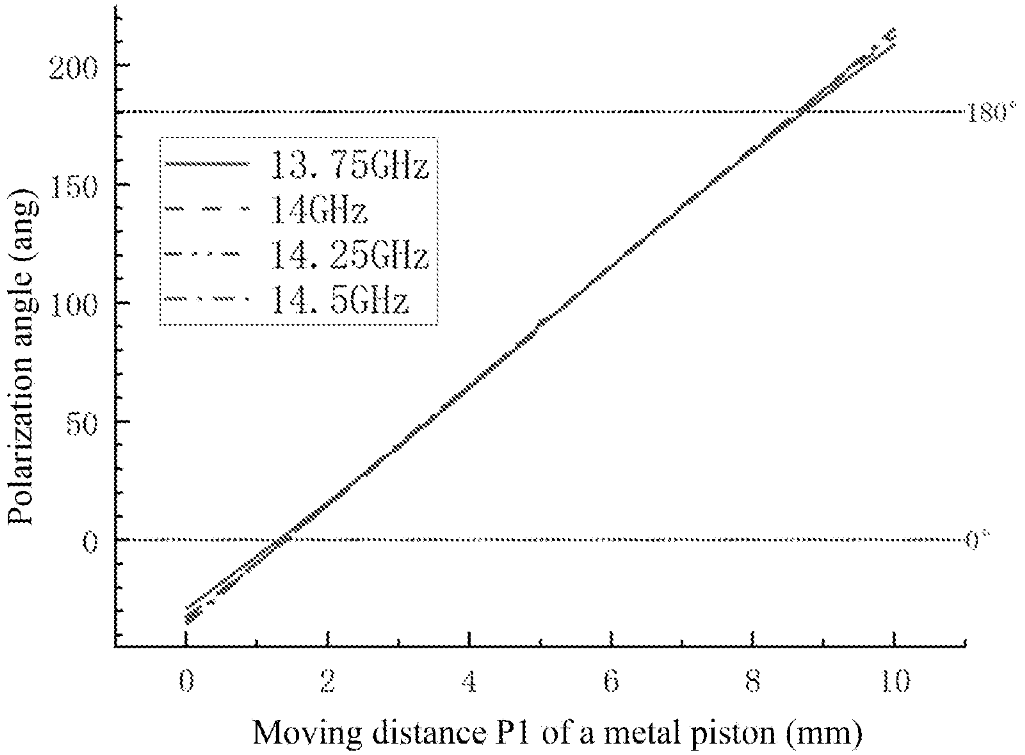
FIG. 15 is a relationship of a polarization angle of a polarization tracker changing with a moving distance of a metal piston.

$V_{21}$ represents an amplitude of the second signal output port 7-3, and $V_{31}$ represents the amplitude of the third signal output port 7-4. FIG. 15 describes that the polarization angle is linearly related to P1 in a process in which a value of the moving distance P1 of the metal piston gradually increases from P1=0 mm to P1=10 mm, and a curve obtained in a 13.75 GHz to 14.5 GHz frequency range and a polarization angle 0° to 180° range basically overlaps, and the polarization angle covers 180°.

FIG. 14 shows a relationship between total signal output amplitudes and phases of the second signal output port 7-3 and the third signal output port 7-4 and a position of the metal piston. FIG. 15 shows a relationship between a polarization angle rotation of the polarization tracker in the present disclosure and a position of the metal piston. It can be seen that the polarization angle changes linearly with movement of the position of the metal piston, which meets an engineering use requirement. It should be noted that, although an operating frequency of the polarization tracker provided in the present disclosure is 13.75 GHz to 14.5 GHz, the polarization tracker is applicable to another frequency band in an equal-to-scale manner.

Figure 16:
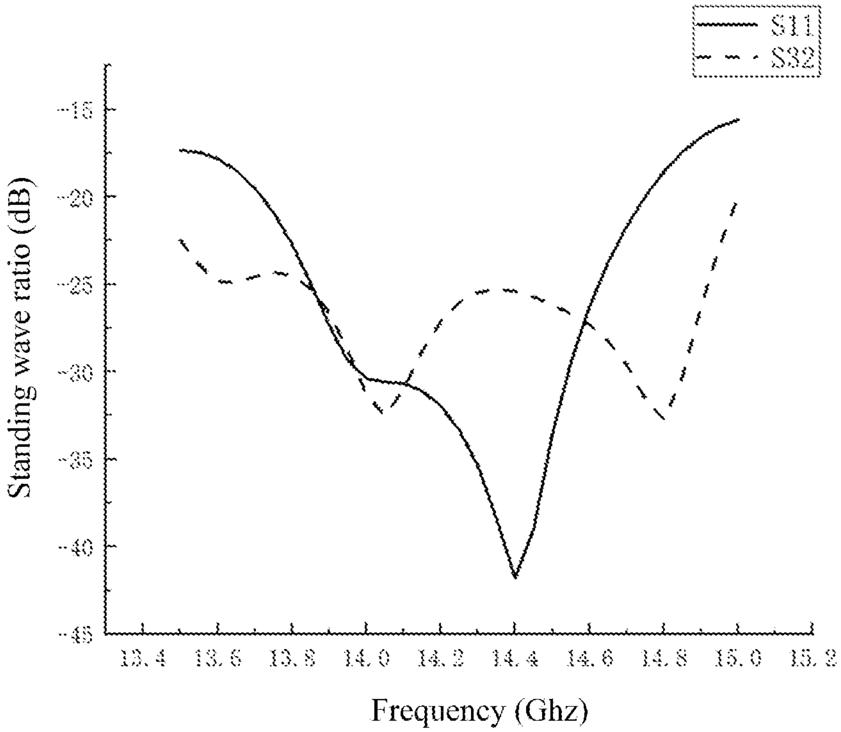
FIG. 16 is a standing wave ratio (S11) of a signal input end of a polarization tracker and port isolation (S32) of a second signal output port and a third signal output port.

When the first reflective phase shifter 4 and the second reflective phase shifter 5 are in an initial state (that is, P1=0 mm), a standing wave ratio of the signal input end 2 of the polarization tracker and port isolation between the second signal output port 7-3 and the third signal output port 7-4 are simulated, and a result is shown in FIG. 16. As shown in FIG. 16, in an operating frequency range of 13.5 GHz to 14.9 GHz, a standing wave ratio (S11, represented by a solid line) of the signal input end 2 of the polarization tracker is less than −20 dB, and in an operating frequency range of 13.85 GHz to 14.6 GHz, port isolation (S32, represented by a dashed line) between the second signal output port 7-3 and the third signal output port 7-4 of the polarization tracker is less than −25 dB.

In conclusion, the polarization tracker provided in the present disclosure has the following advantages:

(1) In the present disclosure, a 3 dB coupler is used as a core, and a reflective variable phase shifter is used to implement any polarization angle adjustment based on a polarization synthesis principle. Feasibility of the polarization tracker is verified through theoretical derivation, computer simulation, and processing measurement; a principle diagram and a model diagram of the polarization tracker are given; and polarization synthetic angle curves of the three manners are basically consistent by changing a moving distance of a metal piston.

(2) In the present disclosure, a structure is simple, it is easy to process and assemble, and there are few parts. Processing can be implemented only cutting it in half by means of machining, and an accuracy requirement for machining is not high. Compared with a product in the conventional technology, use of a coaxial probe is reduced, thereby reducing processing difficulty and assembling difficulty.

(3) Performance of the polarization tracker in the present disclosure, such as a bandwidth, a standing wave ratio, and port isolation, is not lower than that of a product in the conventional technology, and an insertion loss, a large power capacity and stability are better than that of an existing product.

(4) The polarization tracker in the present disclosure can change a position of a metal piston by using a motor drive apparatus, so as to achieve an effect that any polarization angle can be continuously and linearly adjusted, an output of a polarization angle can be accurately adjusted by computing, and the metal piston is a mountain-shaped choke piston, such that an energy leakage can be well suppressed.

What is claimed is:

1. A polarization tracker, comprising a waveguide housing, and a signal input end, a first directional coupler connected to the signal input end, a first reflective phase shifter, a second reflective phase shifter, a second directional coupler, and a signal output end connected to the second directional coupler, wherein the first reflective phase shifter and the second reflective phase shifter are coupled to the first directional coupler; the signal input end, the first directional coupler, the first reflective phase shifter, the second reflective phase shifter, the second directional coupler, and the signal output end are disposed in the waveguide housing; wherein the first directional coupler divides an input signal into two output signals;

the first reflective phase shifter and the second reflective phase shifter respectively regulate and control the two output signals of the first directional coupler to obtain two phase shift signals; a structure of the first reflective phase shifter is the same as a structure of the second reflective phase shifter, the first reflective phase shifter comprises a first short-circuit stub, a third directional coupler, and a first metal piston that surrounds at least a part of the first short-circuit stub, and the second reflective phase shifter comprises a second short-circuit stub, a fourth directional coupler, and a second metal piston that surrounds at least a part of the second short-circuit stub;

the second directional coupler is configured to perform a superposition output on the two phase shift signals to obtain two superposed output signals; and the signal output end is configured to separately convert the two superposed output signals into two final output signals.

2. The polarization tracker according to claim 1, wherein the signal input end comprises a first signal input port, a first signal output port, and a first channel coupled to the first signal input port and the first signal output port.

3. The polarization tracker according to claim 1, wherein the first directional coupler, the second directional coupler, the third directional coupler, and the fourth directional coupler are all 3 dB couplers.

4. The polarization tracker according to claim 3, wherein the first directional coupler, the second directional coupler, the third directional coupler, and the fourth directional coupler are four-port components;

a first port and a second port of the first directional coupler are respectively connected to the signal input end and a load end, and a third port and a fourth port of the first directional coupler are respectively connected to a first port of the third directional coupler and a third port of the fourth directional coupler by using a first channel, wherein the first directional coupler is coupled to the first reflective phase shifter and the second reflective phase shifter;

a second port of the third directional coupler is connected to a first port of the second directional coupler by using a second channel, and a fourth port of the fourth directional coupler is connected to a second port of the second directional coupler by using a third channel, wherein the first reflective phase shifter and the second reflective phase shifter are coupled to the second directional coupler; and a third port and a fourth port of the second directional coupler are connected to the signal output end.

5. The polarization tracker according to claim 1, wherein the signal output end comprises a second signal input port, a third signal input port, a second signal output port, a third signal output port, a second channel coupled to the second signal input port and the second signal output port, and a third channel coupled to the third signal input port and the third signal output port.

6. The polarization tracker according to claim 1, wherein the polarization tracker further comprises a coupling member that couples the first directional coupler, the second directional coupler, the third directional coupler, and the fourth directional coupler together; and the coupling member is in a shape of "I" and comprises an upper connection part, a lower connection part, and a middle connection part between the upper connection part and the lower connection part.

7. The polarization tracker according to claim 1, wherein a structure of the first metal piston is similar to a structure of the second metal piston, and each of the structures of the first and second metal pistons having an overall U-shape having a mirror symmetrical structure; both the first metal piston and the second metal piston comprise a first connecting member in a U-shaped structure, a second connecting member connected to two ends of an open end of the U-shaped structure of the first connecting member, and a third connecting member connected to the second connecting member by using a connection arm; and the third connecting member is of a U-shaped structure, an open end of the U-shaped structure of the third connecting member faces the second connecting member, one end of the connection arm is connected to a middle of the second connecting member, and the other end of the connection arm extends into the third connecting member and is connected to a middle position at a bottom of the U-shaped structure of the third connecting member.

8. The polarization tracker according to claim 7, wherein the first connecting member has a first width along a depth direction of a mounting groove on the waveguide housing, the second connecting member and the third connecting member have a second width along the depth direction of the mounting groove on the waveguide housing, and the second width is greater than the first width.

9. The polarization tracker according to claim 7, wherein the U-shaped structure of the third connecting member has two free arms and a thickness of each of the two free arms of the U-shaped structure of the third connecting member is the same as a thickness of the connection arm and is greater than a spacing between the U-shaped structure of the third connecting member and the connection arm.

10. The polarization tracker according to claim 1, wherein the first directional coupler, the second directional coupler, the third directional coupler, and the fourth directional coupler are all four-port components; a first port and a second port of the first directional coupler are respectively connected to the signal input end and a load end, and a third port and a fourth port of the first directional coupler are respectively connected to a first port of the third directional coupler and a third port of the fourth directional coupler by using a channel, such that the first directional coupler is coupled to the first reflective phase shifter and the second reflective phase shifter; a second port of the third directional coupler is connected to a first port of the second directional coupler by using a channel, and a fourth port of the fourth directional coupler is connected to a second port of the second directional coupler by using a channel, such that the first reflective phase shifter and the second reflective phase shifter are coupled to the second directional coupler; and a third port and a fourth port of the second directional coupler are connected to the signal output end.

11. The polarization tracker according to claim 10, wherein at least two separation blocks are disposed in cavities of the first directional coupler, the second directional coupler, the third directional coupler, and/or the fourth directional coupler.

* * * * *